US011354052B2

(12) United States Patent
Luo et al.

(10) Patent No.: US 11,354,052 B2
(45) Date of Patent: Jun. 7, 2022

(54) MEMORY SUB-SYSTEM MEDIA MANAGEMENT OPERATION THRESHOLD

(71) Applicant: Micron Technology, Inc., Boise, ID (US)

(72) Inventors: Xiangang Luo, Fremont, CA (US); Jianmin Huang, San Carlos, CA (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/002,070

(22) Filed: Aug. 25, 2020

(65) Prior Publication Data

US 2022/0066638 A1    Mar. 3, 2022

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ....... G06F 3/064; G06F 3/0679; G06F 3/0604
See application file for complete search history.

(56) References Cited

U.S. PATENT DOCUMENTS

| 2014/0231954 | A1  | 8/2014 | Lue |
| 2016/0179386 | A1  | 6/2016 | Zhang |
| 2019/0171389 | A1* | 6/2019 | Muthiah ............... G06F 3/0679 |
| 2019/0267080 | A1* | 8/2019 | Natarajan ........... G11C 11/5628 |

FOREIGN PATENT DOCUMENTS

WO    2017074570 A1    5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — David Yi
*Assistant Examiner* — Dustin B. Fulford
(74) *Attorney, Agent, or Firm* — Brooks, Cameron & Huebsch, PLLC

(57) ABSTRACT

An apparatus can include a media management threshold component. The media management threshold component can determine a first threshold quantity of blocks for a first memory mode in the memory device. The media management threshold component can determine a second threshold quantity of blocks for a second memory mode in the memory device. The media management threshold component can determine a logical saturation of the memory device. The media management threshold component can cause performance of a media management operation based on the determined first threshold quantity, the determined second threshold quantity, and a percentage of the determined logical saturation to a total logical saturation of the memory device.

20 Claims, 5 Drawing Sheets

MEMORY SUB-SYSTEM MEDIA MANAGEMENT OPERATION THRESHOLD

TECHNICAL FIELD

Embodiments of the disclosure relate generally to memory sub-systems, and more specifically, relate to memory sub-system media management operation threshold.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
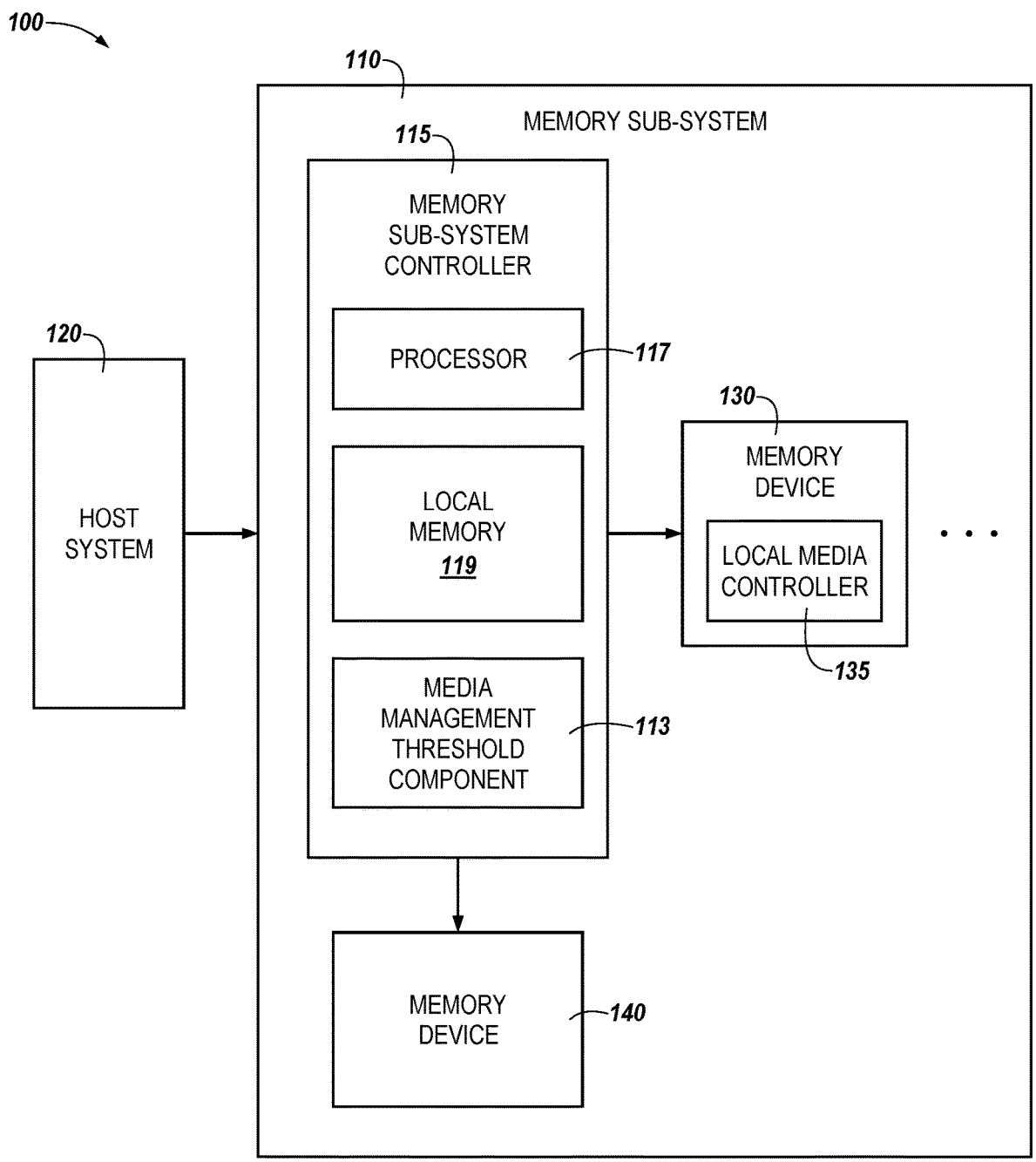
FIG. 1 illustrates an example computing system that includes a memory sub-system in accordance with some embodiments of the present disclosure.

Aspects of the present disclosure are directed to media management operation thresholds associated with a memory sub-system, in particular to memory sub-systems that include a media management threshold component. A memory sub-system can be a storage device, a memory module, or a hybrid of a storage device and memory module. An example of a memory sub-system is a storage system, such as a solid state drive (SDD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

An SSD is a type of memory sub-system that uses integrated circuit assemblies to store data persistently, typically using flash memory. An SSD can include memory devices that include one or more arrays of memory cells. The performance, endurance, and/or retention of an SSD can be related to the type(s) of memory cells employed by the SSD. In general, as the quantity of bits stored per cell increases, the sensitivity of retention (the ability to maintain stored data integrity over a specified length of time) of the memory cell to fluctuations in temperature tends to increase. A retention failure can lead to errors and can cause events that are performed by the SSD to fail or not occur correctly. Temperature fluctuations can occur for extended periods of time during transportation of an SSD post-manufacturing. As an example, memory cells storing data in a single-level cell (SLC) mode can be less susceptible to damage due to high temperature fluctuations than a memory cell storing data in a non-SLC (e.g., multi-(MLC), tri-(TLC), or quad-(QLC), penta-(PLC) level cell mode).

In order to achieve improved write performance of a memory device, an SLC block of memory can be used. In order to provide enough memory space for a host to ensure a particular write performance, a particular quantity of SLC blocks of memory versus non-SLC (e.g., MLC, TLC, QLC, PLC, etc.) blocks of memory can be used. The quantity of SLC blocks of memory can be affected by a logical saturation as a proximity to a total logical saturation gets closer and closer, the threshold quantity of SLC blocks of memory can be harder to achieve. As used herein, logical saturation can refer to a quantity of memory space that is being utilized by a memory device. For example, a quantity of blocks of memory associated with logical addresses that have been written to or that stores valid data can be referred to as logical saturation.

In some previous approaches, SLC mode blocks of memory and non-SLC mode blocks of memory can be monitored separately in order to determine how many of each type of block of memory includes free blocks of memory (e.g., blocks of memory that can be written to without erasing previous data that is still valid). This can lead to an issue where additional unnecessary data is used to close a non-SLC block. For example, different strategies of media management (e.g., garbage collection, data folding, etc.) can be used for SLC mode blocks of memory and non-SLC mode blocks of memory. With SLC mode blocks of memory, the SLC blocks of memory that are closed can be folded to non-SLC mode blocks and with non-SLC mode blocks of memory, the non-SLC blocks of memory can be folded to non-SLC mode blocks of memory. Since any open blocks of memory for the SLC garbage collection are retained, a non-SLC mode block may not be able to be closed during the SLC garbage collection. This requires storing data during the garbage collection that could be avoided if a same garbage collection strategy was integrated for both SLC blocks of memory and non-SLC blocks of memory.

Aspects of the present disclosure address the above and other deficiencies by using a dynamic SLC type of memory can allow for monitoring of free blocks of memory that can be used as SLC blocks of memory or non-SLC blocks of memory once the blocks of memory are initially written to. For example, a threshold first quantity of SLC blocks of memory and a threshold second quantity of non-SLC blocks of memory can be determined and an integrated media management operation, such as a garbage collection process, can be used to ensure that as the logical saturation increases, the balance between SLC mode blocks of memory and non-SLC blocks of memory is achieved. An advantage of the present disclosure includes minimizing storage of unnecessary blocks of memory during media management operations (e.g. garbage collection, folding, etc.) and streamlining the process of transitioning from SLC blocks of memory to non-SLC blocks of memory while maintaining a minimum quantity of SLC blocks of memory to ensure a particular write performance of the memory device. Embodiments described herein include a media management threshold component resident on the memory sub-system (e.g., on the memory sub-system controller), to make it possible to control the quantity of SLC mode blocks of memory and non-SLC mode blocks of memory used in the memory device of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a media management threshold component 113 (or "DB threshold component," for brevity) that can be configured to orchestrate and/or perform operations to determine thresholds for a quantity of blocks of memory and can use various components, data paths, and/or interfaces of the memory sub-system 110 to do so. The media management threshold component 113 can include various circuitry to facilitate garbage collection operations and control of the storage of data in the memory cells of the memory devices 130, 140. For example, the media management threshold component 113 can include a special purpose circuitry in the form of an ASIC, FPGA, state machine, and/or other logic circuitry or software and/or firmware that can allow the media management threshold component 113 to orchestrate and/or perform data storage operations and communicate to various components, data paths, and/or interfaces of the memory sub-system 110.

The media management threshold component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110. In some embodiments, the operations performed by the media management threshold component 113 can be performed during an initialization or pre-initialization stage of data transfer within the memory sub-system 110 and/or the memory sub-system controller 115. Accordingly, in some embodiments, the media management threshold component 113 can perform the operations described herein prior to data transfer in order to determine a mode that data is stored in, which can effect subsequent data transfer speeds of the data out of the cells storing in that particular mode.

In some embodiments, the memory sub-system controller 115 includes at least a portion of the media management threshold component 113. For example, the memory sub-system controller 115 can include a processor 117 (processing device) configured to execute instructions stored in local memory 119 for performing the operations described herein. In some embodiments, the media management threshold component 113 is part of the host system 110, an application, or an operating system.

The memory devices 130, 140 in FIG. 1 can include a number of physical blocks in accordance with some embodiments of the present disclosure. For example, the memory devices 130, 140 can include a NAND flash memory array including the number of physical blocks. However, embodiments of the present disclosure are not limited to a particular type of memory or memory array. For example, the memory array can be a DRAM array, an RRAM array, or a PCRAM array, among other types of memory arrays. Further, the memory array can be located on a particular semiconductor die along with various peripheral circuitry associated with the operation thereof.

The memory cells of the memory array can be mixed mode cells operable as SLCs and/or XLCs (e.g., extra-level cells which can refer to cells operable at a level greater than SLCs, also referred to as non-SLC mode cells). The number of physical blocks in the memory array can be 128 blocks, 512 blocks, or 1,024 blocks, but embodiments are not limited to a particular multiple of 128 or to any particular number of physical blocks in memory array. Further, different portions of memory can serve as a dynamic SLC cache for garbage collection purposes. For example, different portions of memory can be dynamically increased and/or decreased in size as demands on the memory are increased and/or decreased and garbage collection more efficiently address these demands.

Each physical block of the memory array can contain a number of physical rows of memory cells coupled to access lines (e.g., word lines). The number of rows (e.g., word lines) in each physical block can be 32, but embodiments are not limited to a particular number of rows per physical block. Further, the memory cells can be coupled to sense lines (e.g., data lines and/or digit lines).

Each row can include a number of pages of memory cells (e.g., physical pages). A physical page refers to a unit of programming and/or sensing (e.g., a number of memory cells that are programmed and/or sensed together as a functional group). Each row can comprise one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a non-limiting example, an apparatus (e.g., the computing system 100) can include a memory sub-system media management threshold component 113. The memory sub-system media management threshold component 113 can be resident on the memory sub-system 110. As used herein, the term "resident on" refers to something that is physically located on a particular component. For example, the memory sub-system media management threshold component 113 being "resident on" the memory sub-system 110 refers to a condition in which the hardware circuitry that comprises the memory sub-system media management threshold component 113 is physically located on the memory sub-system 110. The term "resident on" can be used interchangeably with other terms such as "deployed on" or "located on," as referred to herein.

The memory sub-system media management threshold component 113 can be configured to determine a first threshold quantity of SLC mode blocks of memory and a second threshold quantity of non-SLC mode blocks of memory to maintain. The memory sub-system media management threshold component 113 can determine to modify the first threshold or the second threshold in response to a change in the logical saturation of the memory device, as will be described further in association with FIGS. 3A-3C.

Figure 2:
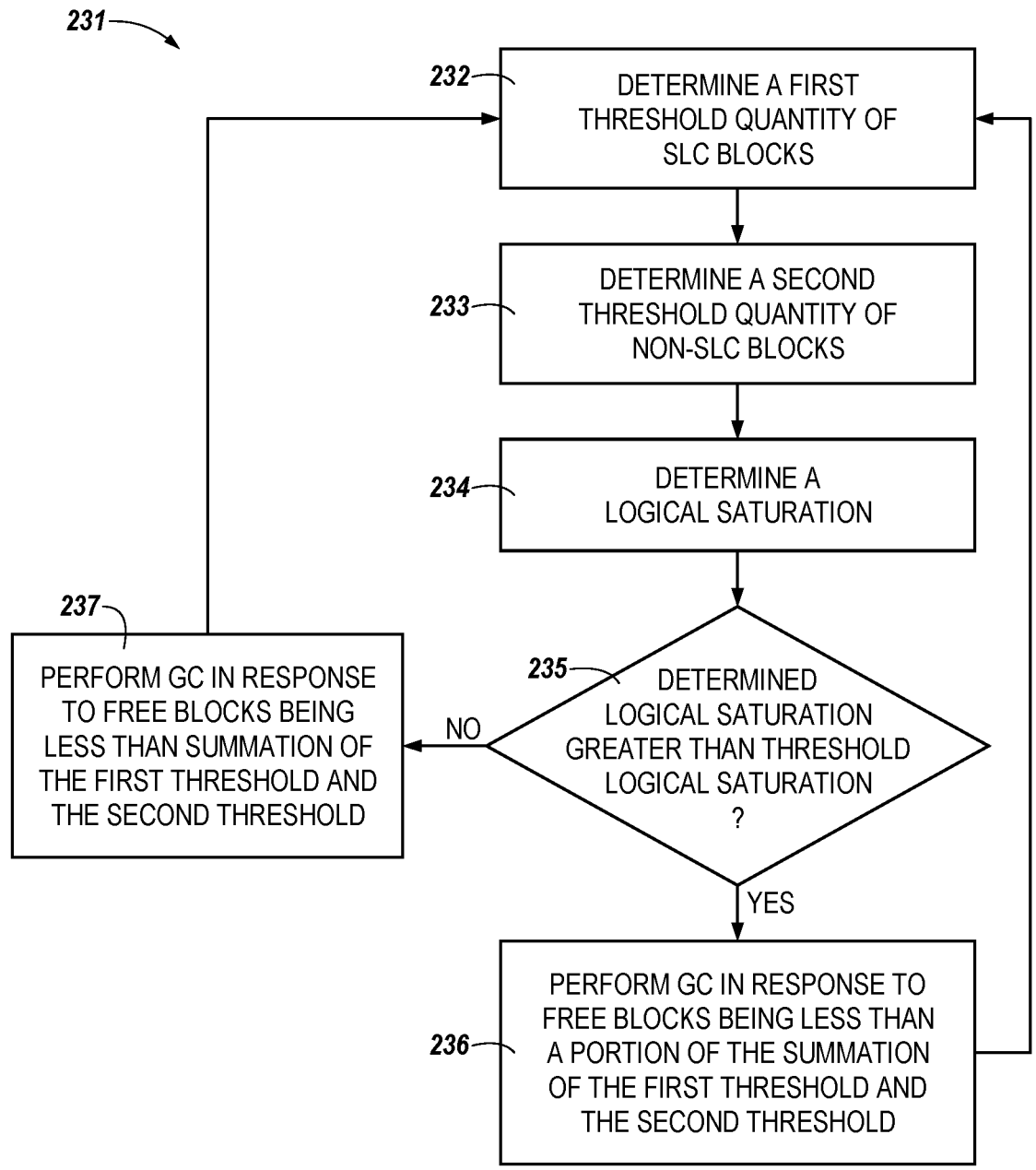
FIG. 2 illustrates an example of performing a media management operation using a media management threshold in accordance with some embodiments of the present disclosure.

FIG. 2 illustrates an example diagram 231 for performing a media management operation, such as a garbage collection operation, using a media management threshold in accordance with some embodiments of the present disclosure. At operation 232, a media management threshold component (such as media management threshold component 113 in FIG. 1) can determine a first threshold quantity of SLC blocks to use in order to maintain a particular write performance. As an example, a determination can be made that 64 blocks of memory should be maintained for use as SLC blocks in order to provide a particular speed and efficiency of data transfer and processing.

At operation 233, the media management threshold component can determine a second threshold quantity of non-SLC blocks to be maintained. In response to a quantity of free blocks of memory being below a combination of the first threshold quantity of SLC blocks and the second threshold quantity of non-SLC blocks, a garbage collection operation can be performed in order to maintain the quantity of SLC and non-SLC blocks. However, a logical saturation of the memory device can have an effect on the thresholds as more data is written to SLC and non-SLC blocks.

At operation 234, a logical saturation of the memory device can be determined. As an example, a determination can be made as to how many logical addresses have been allocated for use by blocks of memory that have been written to. A threshold percentage of the logical saturation can be determined to maintain a particular garbage collection process below the threshold percentage and modify the garbage collection operation when the logical saturation is above the threshold percentage. As an example, the threshold percentage of logical saturation can be 90%. In response to the logical saturation being between 0 and 90%, the garbage collection operation can be performed in response to a quantity of free blocks of memory (e.g., blocks of memory that haven't been written to or that have been allocated for data to be written to) being less than the first threshold quantity of SLC blocks and the second threshold quantity of non-SLC blocks combined.

For example, if the first threshold quantity of SLC blocks is 64 and the second threshold quantity of non-SLC blocks is 16, the garbage collection operation can be performed when the quantity of free blocks of memory is less than 80 blocks when the logical saturation is between 0% to 90%. For clarification, when the logical saturation percentage is less than 90%, the quantity of free blocks of memory to trigger a garbage collection can be designated as N+A, where N is the first threshold quantity of SLC blocks and A is the second threshold quantity of non-SLC blocks (in this example 64+16=80). That is, at operation 237, the garbage collection (GC) is performed in response to the quantity of free blocks being less than a summation of the first threshold quantity of SLC blocks and the second threshold quantity of non-SLC blocks.

However, in response to the percentage of the logical saturation being greater than the threshold percentage, greater than 90% in this example, the threshold quantity of free blocks can be modified in the following manner. As is illustrated in FIG. 2, at operation 236, a garbage collection (GC) can be performed in response to the quantity of free blocks being less than a portion of the summation of the first threshold quantity of SLC blocks and the second threshold quantity of non-SLC blocks. For example, using the examples provided above, the threshold quantity of free blocks is equal to $A+N-((LS-90\%)*(N/10))$. For the sake of this example, if we make the current logical saturation at 95%, the threshold quantity of free blocks would be $16+64-((95-90)*(64/10))$, which broken down equals $80-((5)*(6.4))$, which equals 48 (which is illustrates further in association with FIG. 3A, described below).

Figure 3A:
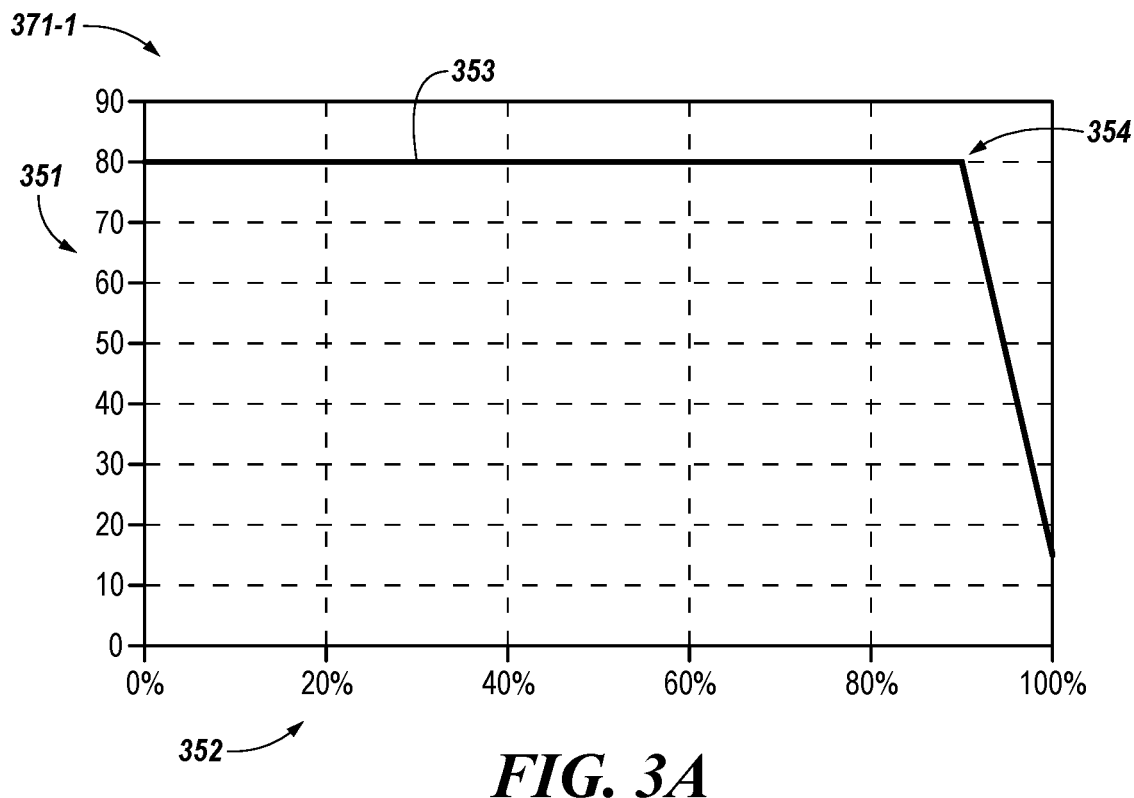
FIGS. 3A-3C each illustrate an example diagram showing data associated with a media management operation threshold in accordance with some embodiments of the present disclosure.
Figure 3B:
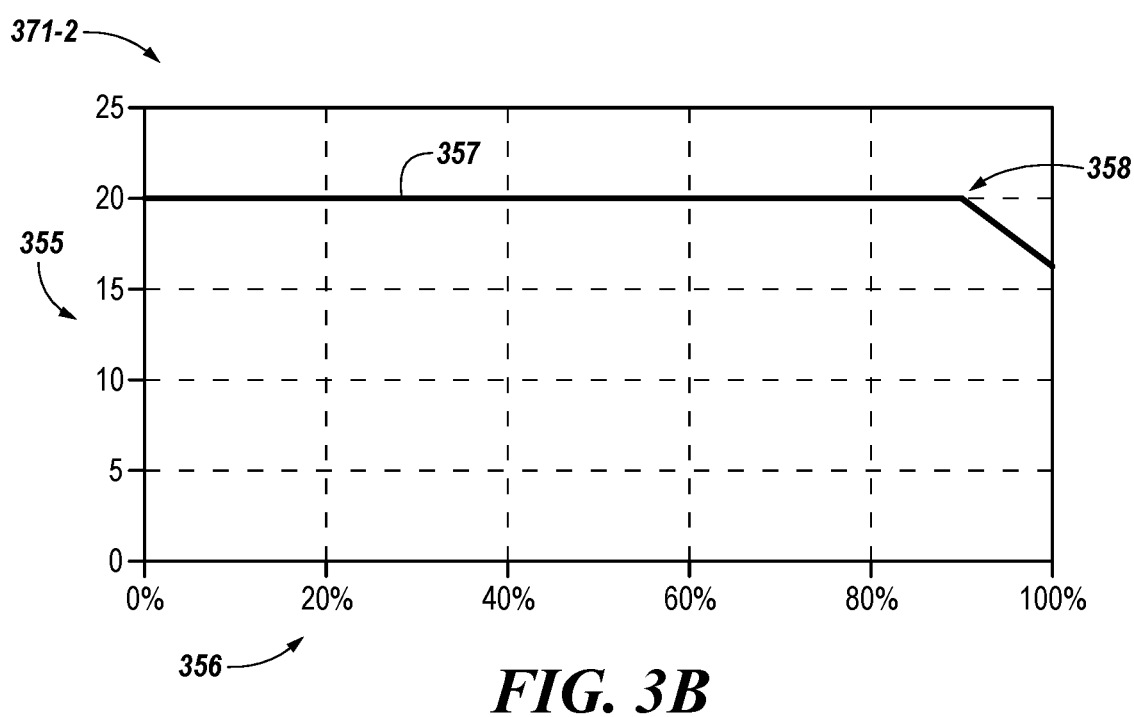
Figure 3C:
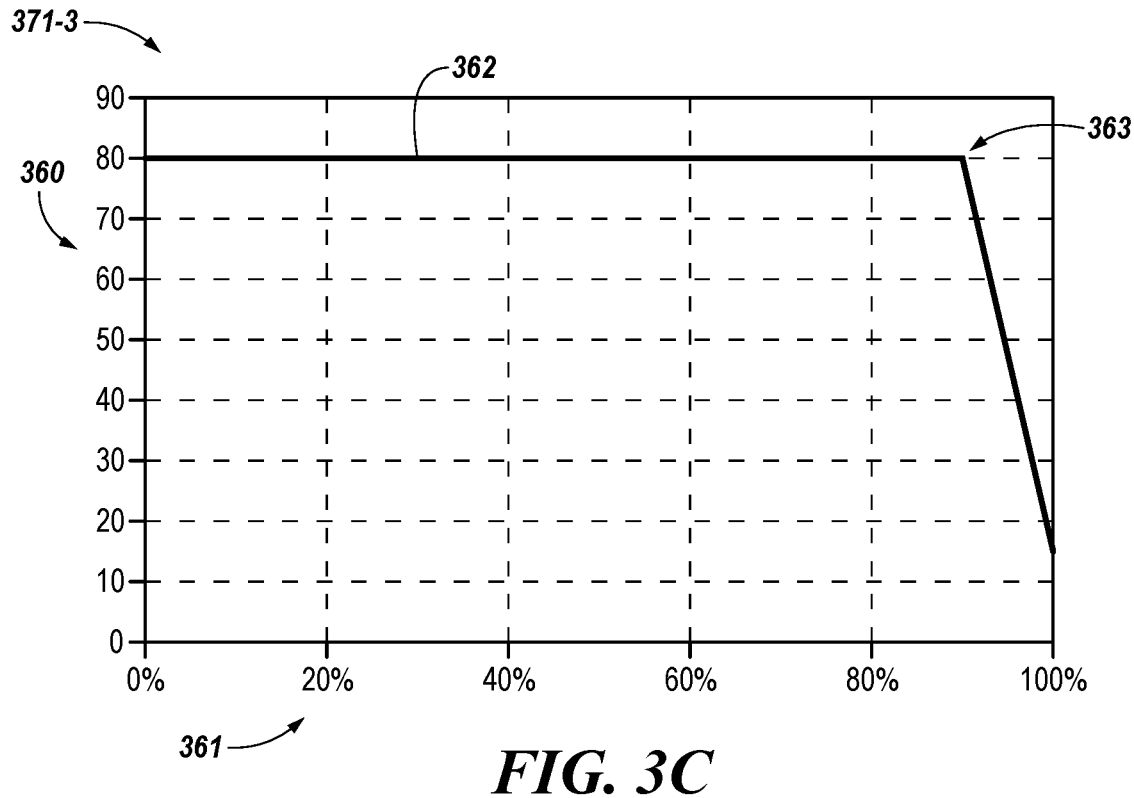

FIGS. 3A-3C each illustrate an example diagram 371-1 to 371-3 showing data associated with a media management threshold in accordance with some embodiments of the present disclosure. In FIG. 3A, a threshold quantity of free blocks 351 is used to trigger a garbage collection operation. A logical saturation percentage 352 determines what the threshold quantity of free blocks 351 results in. As an example, when a threshold logical saturation percentage is 90%, the threshold quantity of free blocks 351 is modified at 90% logical saturation in line with the equation provided above (e.g., $A+N-((LS-90\%)*(N/10))$). While a particular equation is provided as an example, embodiments are not so limited. The summation of the first and second thresholds (A+N) can be modified in a number of different ways. Further, the modifying portion of the equation $((LS-90\%)*(N/10))$ can be rounded up such that the result is a whole number and a total block quantity is used rather than a portion of a block for garbage collection.

FIG. 3B is used to illustrate the scenario when data has been written to SLC blocks of memory blocks of memory and at least a portion of the SLC blocks have been consumed. Therefore, the above calculation is modified by subtracting the quantity of SLC blocks that have been written to. For example, N-X blocks are needed by the memory sub-system controller to maintain a particular write performance, where N is the quantity of SLC blocks needed and X is the quantity of SLC blocks consumed. In this illustrated example of FIG. 3B, the quantity of consumed blocks is 60 and N (64)-X (60)=4. The equation for when the logical saturation percentage is below the threshold percentage (e.g., below 90% in this example), the threshold quantity of free blocks is 20, as is illustrated in FIG. 3B. The equation provided above can be modified as follows: $(A+N-X)-((LS-90\%)*(N-X/10))$. As can be seen in the illustrated diagram of FIG. 3B, when the logical saturation is at or near to 100%, the equation is $16+64-60-(100-90)*(0.4)=20-4=16$.

FIG. 3C illustrates what occurs in response to an SLC flush command. The SLC flush command causes a clearing of the SLC blocks of memory and folds them into TLC blocks of memory, freeing up the same amount of memory space as prior to the SLC blocks of memory being written to. For example, the 60 SLC blocks of memory written to in the example of FIG. 3B brought the quantity of free SLC blocks of memory to 4. This quantity is returned to a full 64 SLC blocks of memory (e.g., in effect making the quantity of "X" described in relation to FIG. 3B a zero (0)), the same quantity as prior to the write. In turn, this brings the threshold quantity of free blocks back to the quantity of 80, as illustrated in FIG. 3C.

In some embodiments, the garbage collection operation is triggered based on whether the quantity of free blocks is less than the threshold quantity of free blocks for the flush command of SLC and non-SLC write periods. In relation to the flush command associated with SLC blocks, the garbage collection operation should release enough free blocks in time according to A+N between a logical saturation of 0% to 90% and $A+N-(LS-90\%)*N/10$ for logical saturation greater than 90%.

In some embodiments, the garbage collection operation can cause the memory sub-system controller to select the source blocks based on a valid transfer unit count (VTC), which corresponds to a quantity of valid data contained within a block of memory cells regardless of the block that is written to in SLC or non-SLC mode. In some embodiments, the source blocks that exhibit the least or lowest VTC can be selected regardless of whether the source blocks were written in SLC or non-SLC mode. In one example, for the SLC flush, a real VTC can be used for SLC blocks but for non-SLC blocks the garbage collection can use a real VTC*3 (which accounts for a ratio between a TLC and SLC mode data cell) for SLC blocks which can provide a least valid ratio block for the garbage collection source blocks.

In some examples, for the SLC flush, the source blocks can be the same as the non-SLC blocks since the SLC blocks have less VTC than the TLC blocks for the same valid data rate except that the valid rate of the TLC block can be less than ⅓ of the SLC block. For that particular situation, an SLC flush can flush the TLC block of memory but may not flush the non-SLC block of memory and can improve the written capability since it invalidates the significantly low valid ratio block to begin with.

Figure 4:
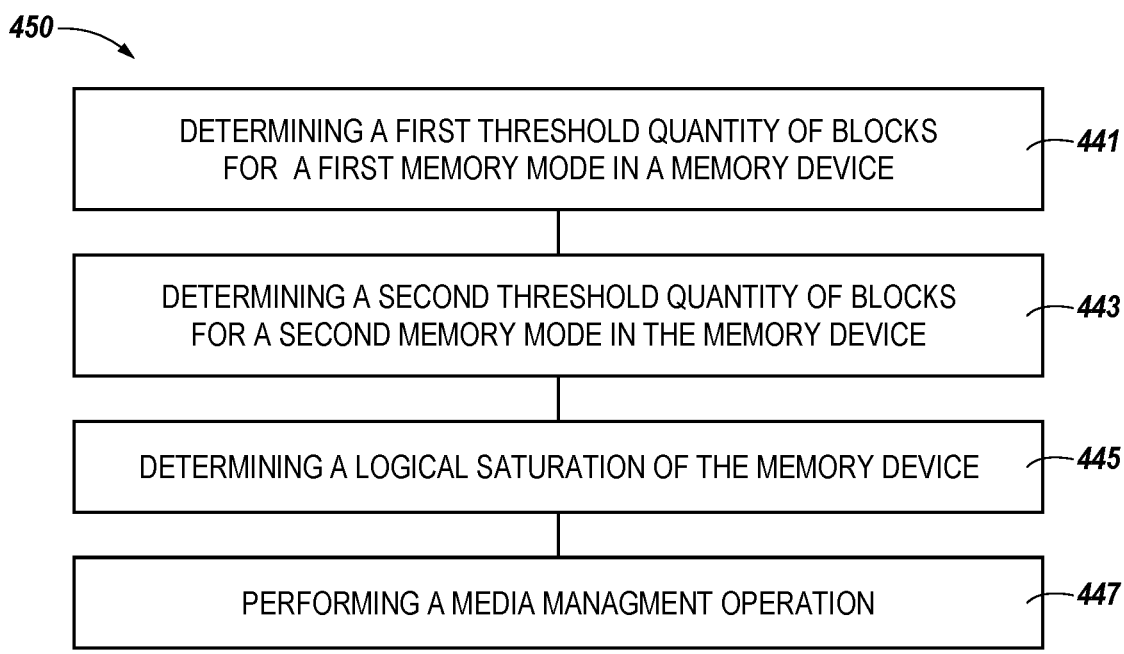
FIG. 4 is a flow diagram corresponding to a method for performing media management operations using media management thresholds in accordance with some embodiments of the present disclosure.

FIG. 4 is a flow diagram corresponding to a method 450 for performing memory sub-system operations for garbage collection operations using a media management threshold in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the media management threshold component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, a first threshold quantity of blocks for a first memory mode in a memory device can be determined by the media management threshold component. The first memory mode can be an SLC memory mode. The media management threshold component can be analogous to the media management threshold component in FIG. 1.

At operation 443, a second threshold quantity of blocks for a first memory mode in a memory device can be determined by the media management threshold component. The second memory mode can be a non-SLC memory mode.

At operation 445, a logical saturation of the memory device can be determined. As used herein, logical saturation can refer to a quantity of memory space that is being utilized by a memory device. For example, a quantity of blocks of memory associated with logical addresses that have been written to or that stores valid data can be referred to as logical saturation.

At operation 447, a media management operation can be performed. The garbage collection operation can be performed in response to a quantity of free blocks being below a threshold quantity of free blocks. The threshold quantity of free blocks can be associated with the first threshold quantity of blocks, the second threshold quantity of blocks, and a percentage of the determined logical saturation in relation to a total logical saturation being below a threshold logical saturation percentage.

In some embodiments, the method can further include performing the garbage collection operation in response to a quantity of free blocks being below an additional threshold quantity of free blocks. The additional threshold quantity of free blocks can be associated with: the first threshold quantity of blocks, the second threshold quantity of blocks, and the percentage of the determined logical saturation being above a threshold logical saturation percentage. In some embodiments, the threshold quantity of free blocks can be less than the additional threshold quantity of free blocks. In some embodiments, the threshold logical saturation percentage is ninety (90) percent. In some embodiments, the threshold quantity of free blocks includes a summation of the first threshold quantity of blocks and the second threshold quantity of blocks. In some embodiments, the first memory mode is a single-level cell (SLC) memory mode and the second memory mode is a tri-level cell (TLC) memory mode.

Figure 5:
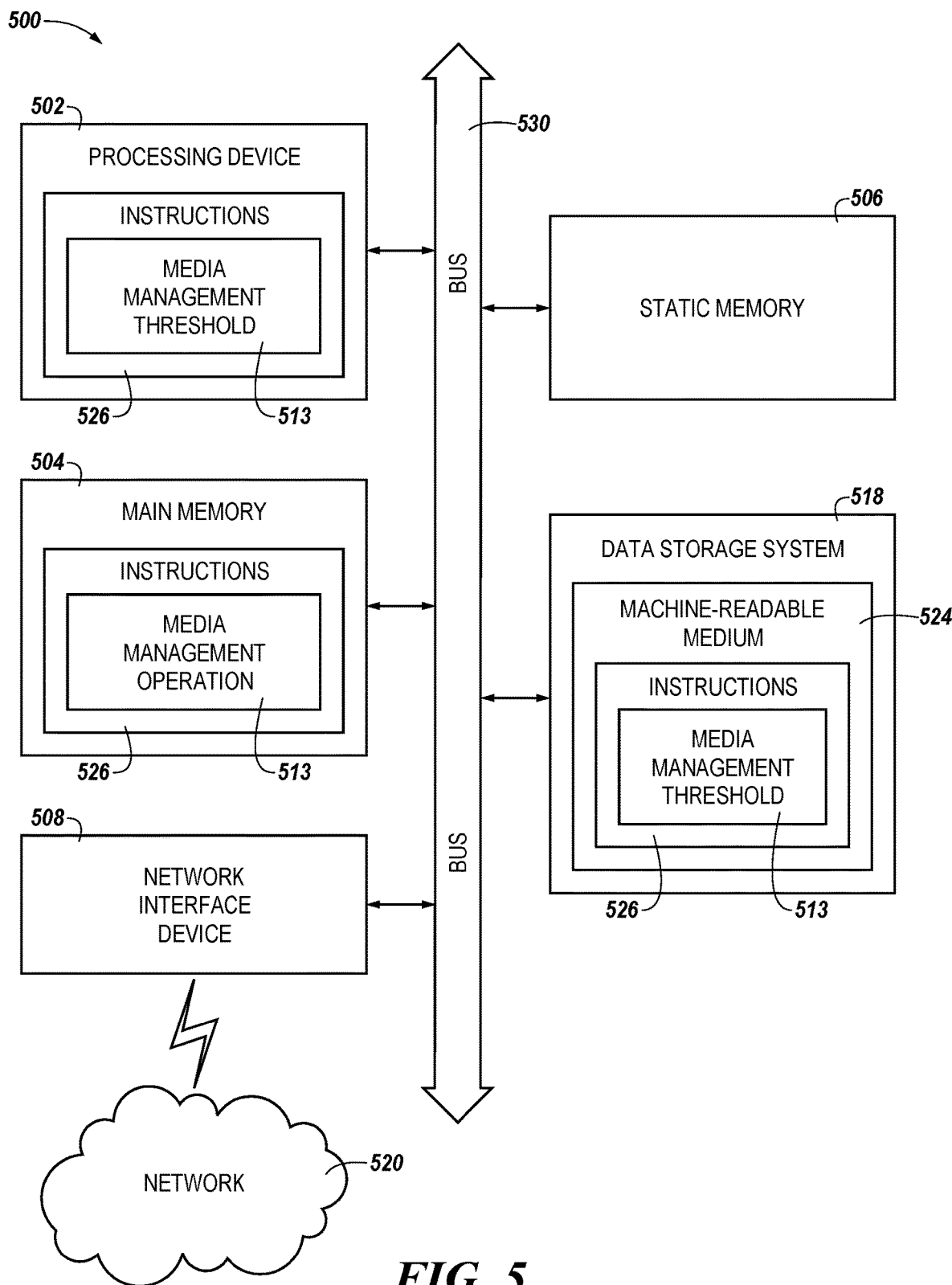
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the storage mode component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 511.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a media management threshold component (e.g., the media management threshold component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including solid state drives (SSDs), hard disk drives (HDDs), floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a media management threshold component to:
   determine a first threshold quantity of blocks for a first memory mode in a memory device coupled to the media management threshold component;
   determine a second threshold quantity of blocks for a second memory mode in the memory device;
   determine a logical saturation of the memory device; and
   cause performance of a media management operation based on the determined first threshold quantity, the determined second threshold quantity, and a percentage of the determined logical saturation to a total logical saturation of the memory device;
   wherein performance of the media management operation is caused in response to a quantity of free blocks of the memory device being below a threshold quantity of free blocks, the threshold quantity of free blocks being less than a summation of the first threshold quantity of blocks and the second threshold quantity of blocks by a particular portion.

2. The apparatus claim 1, wherein the media management threshold component is to further cause the performance of the media management operation in response to the determined logical saturation percentage being less than a threshold logical saturation percentage.

3. The apparatus of claim 1, wherein the media management operation is a garbage collection operation and the media management threshold component is to further cause performance of the garbage collection operation in response to the percentage of the determined logical saturation being above a threshold logical saturation percentage.

4. The apparatus of claim 3, wherein the threshold quantity of free blocks is lower in response to the determined logical saturation percentage being above the threshold logical saturation percentage than if the determined logical saturation percentage was below the threshold logical saturation percentage.

5. The apparatus of claim 3, wherein the media management threshold component is to further correspondingly decrease the threshold quantity of free blocks an amount in relation to the determined logical saturation percentage increasing an amount above the threshold logical saturation percentage.

6. The apparatus of claim 3, wherein the media management threshold component is to further, in response to performance of the media management operation subsequent to the determined logical saturation percentage being above the threshold logical saturation percentage, increase the threshold quantity of free blocks to a different threshold quantity of free blocks greater than the threshold quantity of free blocks.

7. The apparatus of claim 6, wherein the different threshold quantity of free blocks is equal to an additional threshold quantity of free blocks that corresponds to when the determined logical saturation percentage is lower than the threshold logical saturation percentage.

8. The apparatus of claim 1, wherein the first memory mode is a single-level cell (SLC) memory mode.

9. The apparatus of claim 1, wherein the second memory mode is a tri-level cell (TLC) memory mode.

10. A method, comprising:
   determining a first threshold quantity of blocks for a first memory mode in a memory device;
   determining a second threshold quantity of blocks for a second memory mode in the memory device;
   determining a logical saturation of the memory device; and
   performing a media management operation in response to:
      a quantity of free blocks being below a threshold quantity of free blocks, wherein the threshold quantity of free blocks is associated with:
      the first threshold quantity of blocks;
      the second threshold quantity of blocks; and
      a percentage of the determined logical saturation in relation to a total logical saturation being below a threshold logical saturation percentage;
   wherein the threshold quantity of free blocks is less than a summation of the first threshold quantity of blocks and the second threshold quantity of blocks by a particular portion.

11. The method of claim 10, further comprising performing the media management operation in response to:
   a quantity of free blocks being below an additional threshold quantity of free blocks, wherein the additional threshold quantity of free blocks is associated with:
      the first threshold quantity of blocks;
      the second threshold quantity of blocks; and
      the percentage of the determined logical saturation being above a threshold logical saturation percentage.

12. The method of claim 11, wherein the threshold quantity of free blocks is less than the additional threshold quantity of free blocks.

13. The method of claim 10, wherein the threshold logical saturation percentage is ninety (90) percent.

14. The method of claim 10, wherein the threshold quantity of free blocks includes a summation of the first threshold quantity of blocks and the second threshold quantity of blocks.

15. The method of claim 10, wherein the first memory mode is a single-level cell (SLC) memory mode and the second memory mode is a tri-level cell (TLC) memory mode.

16. An apparatus, comprising:
   a memory device comprising a plurality of blocks of memory; and
   a processing device coupled to the memory device, the processing device to perform operations comprising:
      determining a first threshold quantity of blocks for single-level cell (SLC) mode blocks of the plurality of blocks of memory;
      determine a second threshold quantity of blocks for tri-level cell (TLC) mode blocks of the plurality of blocks of memory;
      determine a logical saturation of the plurality of blocks of memory; and
      performing a media management operation in response to a quantity of free blocks of the plurality of blocks of memory being below a threshold quantity of free blocks,
   wherein:
      the threshold quantity of free blocks is based on the determined first threshold quantity, the determined second threshold quantity, and a percentage of the determined logical saturation to a total logical saturation of the plurality of blocks of memory; and
      the threshold quantity of free blocks is, in response to the percentage of the determined logical saturation being above a threshold logical saturation percentage, less than a summation of the first threshold quantity of blocks and the second threshold quantity of blocks by a particular portion.

17. The apparatus of claim 16, wherein the threshold quantity of free blocks is, in response to the percentage of the determined logical saturation being below a threshold logical saturation percentage, a summation of the first threshold quantity of blocks and the second threshold quantity of blocks.

18. The apparatus of claim 16, wherein the particular portion is equal to the difference of the determined logical saturation from the threshold logical saturation percentage multiplied by the first threshold quantity of blocks divided by 10.

19. The apparatus of claim 18, wherein the processing device is to further perform operations comprising flushing a buffer associated with the SLC mode blocks.

20. The apparatus of claim 19, wherein the processing device is to further perform operations comprising returning the threshold quantity of free blocks to a summation of the first threshold quantity of blocks and the second threshold quantity of blocks.

* * * * *